US009999094B2

(12) United States Patent
Sagar et al.

(10) Patent No.: US 9,999,094 B2
(45) Date of Patent: Jun. 12, 2018

(54) WAKEUP SCHEDULE COORDINATION ON A SHARED COMMUNICATION MEDIUM

(71) Applicant: QUALCOMM Incorporated, San Diego, CA (US)

(72) Inventors: Sagar, Hyderabad (IN); Venkata A Naidu Babbadi, Hyderabad (IN); Mohammad Suhel Ashfaque, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/188,370

(22) Filed: Jun. 21, 2016

(65) Prior Publication Data

US 2017/0367143 A1 Dec. 21, 2017

(51) Int. Cl.
*H04M 3/00* (2006.01)
*H04W 76/04* (2009.01)
(Continued)

(52) U.S. Cl.
CPC ............ *H04W 76/27* (2018.02); *H04J 11/00* (2013.01); *H04L 61/6022* (2013.01); *H04W 40/005* (2013.01); *H04W 52/0251* (2013.01); *H04W 76/046* (2013.01); *H04W 88/06* (2013.01); *H04W 36/0005* (2013.01); *H04W 52/0229* (2013.01); *H04W 72/10* (2013.01);
(Continued)

(58) Field of Classification Search
CPC . H04W 76/046; H04W 40/005; H04W 88/08; H04W 84/12; H04J 11/00; H04L 61/6022
USPC ....................................................... 455/418
See application file for complete search history.

(56) References Cited

U.S. PATENT DOCUMENTS 8,885,561 B2 * 11/2014 Wang ................ H04W 72/1215
370/230
2012/0281563 A1 11/2012 Comsa et al.
(Continued)

FOREIGN PATENT DOCUMENTS

WO 2015077971 A1 6/2015
WO 2016012144 A1 1/2016

OTHER PUBLICATIONS

International Search Report and Written Opinion—PCT/US2017/033457—ISA/EPO—dated Aug. 11, 2017.

*Primary Examiner* — Amancio Gonzalez
(74) *Attorney, Agent, or Firm* — Muncy, Geissler, Olds & Lowe, P.C.

(57) ABSTRACT

Techniques for co-existence on a shared communication medium are disclosed. An activation command may be received, over a backhaul connection and via a first Radio Access Technology (RAT), configuring the first RAT for active operation on a shared communication medium. An activity indicator may be generated based on the active operation of the first RAT. Based on the activity indicator, one or more measurements scheduled to be performed on the communication medium in accordance with a second RAT and a corresponding wakeup schedule may be disabled. Access of a first RAT to a shared communication medium may also be monitored. A priority indicator for the first RAT may be generated based on the monitored access. Based on the priority indicator, release of a backhaul connection on the communication medium that is associated with a second RAT may be coordinated.

40 Claims, 9 Drawing Sheets

(51) Int. Cl.
   *H04W 40/00*   (2009.01)
   *H04L 29/12*   (2006.01)
   *H04J 11/00*   (2006.01)
   *H04W 88/06*   (2009.01)
   *H04W 84/12*   (2009.01)
   *H04W 88/08*   (2009.01)
   *H04W 36/00*   (2009.01)
   *H04W 52/02*   (2009.01)
   *H04W 72/10*   (2009.01)
   *H04W 84/02*   (2009.01)

(52) U.S. Cl.
   CPC .......... *H04W 76/048* (2013.01); *H04W 76/28* (2018.02); *H04W 84/02* (2013.01); *H04W 84/12* (2013.01); *H04W 88/08* (2013.01)

(56) References Cited

U.S. PATENT DOCUMENTS

| | | |
|---|---|---|
| 2013/0016648 A1 | 1/2013 | Koskela et al. |
| 2014/0126552 A1 | 5/2014 | Dayal et al. |
| 2014/0269275 A1 | 9/2014 | Jun et al. |
| 2014/0301214 A1 | 10/2014 | Zhang et al. |
| 2015/0257027 A1 | 9/2015 | Bodduru et al. |
| 2017/0099654 A1* | 4/2017 | Elsayed ................ H04W 52/52 |
| 2017/0366979 A1 | 12/2017 | Sagar |

* cited by examiner

WAKEUP SCHEDULE COORDINATION ON A SHARED COMMUNICATION MEDIUM

CROSS-REFERENCE TO RELATED APPLICATIONS

The present Application for Patent is related to the following co-pending U.S. Patent Application: "Radio Access Technology (RAT) Prioritization on a Shared Communication Medium," having U.S. application Ser. No. 15/188,486, filed concurrently herewith, assigned to the assignee hereof, and expressly incorporated herein by reference in its entirety.

INTRODUCTION

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell Wireless Wide Area Network (WWAN) operations, for example, have been extended into the unlicensed frequency spectrum such as the Industrial, Scientific, and Medical (ISM) and Unlicensed National Information Infrastructure (U-NII) bands used by Wireless Local Area Network (WLAN) technologies. This extension of small cell operation is designed to increase spectral efficiency and hence capacity of the WWAN system. However, it may also overlap with the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, receiving, over a backhaul connection and via a first Radio Access Technology (RAT), an activation command configuring the first RAT for active operation on a shared communication medium; generating an activity indicator based on the active operation of the first RAT; and disabling, based on the activity indicator, one or more measurements scheduled to be performed on the communication medium in accordance with a second RAT and a corresponding wakeup schedule.

In another example, a communication apparatus is disclosed. The apparatus may include, for example, at least one transceiver, at least one processor, and at least one memory coupled to the at least one processor. The at least one transceiver may be configured to receive, over a backhaul connection and via a first RAT, an activation command configuring the first RAT for active operation on a shared communication medium. The at least one processor and the at least one memory may be configured to generate an activity indicator based on the active operation of the first RAT, and to disable, based on the activity indicator, one or more measurements scheduled to be performed on the communication medium in accordance with a second RAT and a corresponding wakeup schedule.

In another example, another communication apparatus is disclosed. The apparatus may include, for example, means for receiving, over a backhaul connection and via a first RAT, an activation command configuring the first RAT for active operation on a shared communication medium; means for generating an activity indicator based on the active operation of the first RAT; and means for disabling, based on the activity indicator, one or more measurements scheduled to be performed on the communication medium in accordance with a second RAT and a corresponding wakeup schedule.

In another example, a transitory or non-transitory computer-readable medium is disclosed. The computer-readable medium may include, for example, code for receiving, over a backhaul connection and via a first RAT, an activation command configuring the first RAT for active operation on a shared communication medium; code for generating an activity indicator based on the active operation of the first RAT; and code for disabling, based on the activity indicator, one or more measurements scheduled to be performed on the communication medium in accordance with a second RAT and a corresponding wakeup schedule.

In another example, another communication method is disclosed. The method may include, for example, monitoring access of a first RAT to a shared communication medium; generating a priority indicator for the first RAT based on the monitored access; and coordinating, based on the priority indicator, release of a backhaul connection on the communication medium that is associated with a second RAT.

In another example, another communication apparatus is disclosed. The apparatus may include, for example, at least one transceiver, at least one processor, and at least one memory coupled to the at least one processor. The at least one transceiver may be configured to monitor access of a first RAT to a shared communication medium. The at least one processor and the at least one memory may be configured to generate a priority indicator for the first RAT based on the monitored access, and to coordinate, based on the priority indicator, release of a backhaul connection on the communication medium that is associated with a second RAT.

In another example, another communication apparatus is disclosed. The apparatus may include, for example, means for monitoring access of a first RAT to a shared communication medium; means for generating a priority indicator for the first RAT based on the monitored access; and means for coordinating, based on the priority indicator, release of a backhaul connection on the communication medium that is associated with a second RAT.

In another example, another transitory or non-transitory computer-readable medium is disclosed. The computer-readable medium may include, for example, code for monitoring access of a first RAT to a shared communication medium; code for generating a priority indicator for the first RAT based on the monitored access; and code for coordinating, based on the priority indicator, release of a backhaul connection on the communication medium that is associated with a second RAT.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to inter-Radio Access Technology (RAT) coordination procedures on a communication medium shared with multiple RATs. For example, one RAT may utilize the communication medium to provide "hotspot" service to a hotspot subscriber while another RAT may utilize the communication medium to provide backhaul services for the hotspot connection. To more efficiently manage the wakeup schedule of one RAT around periods of active and inactive communication of another RAT, an activity indicator may be generated to indicate when the communication medium is occupied by the other RAT. Based on the activity indicator and the corresponding potential for inter-RAT conflict, one or more measurements associated with the wakeup schedule may be omitted to conserve power. In addition or as an alternative, to promote timely access to the communication medium such as when latency-sensitive traffic is pending, a priority indicator may be generated for the traffic if a substantial number of unsuccessful access attempts have occurred or a substantial duration of time has elapsed without access to the communication medium. Based on the priority indicator, one of the connections (e.g., the backhaul connection) may be caused to be released to free the communication medium.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
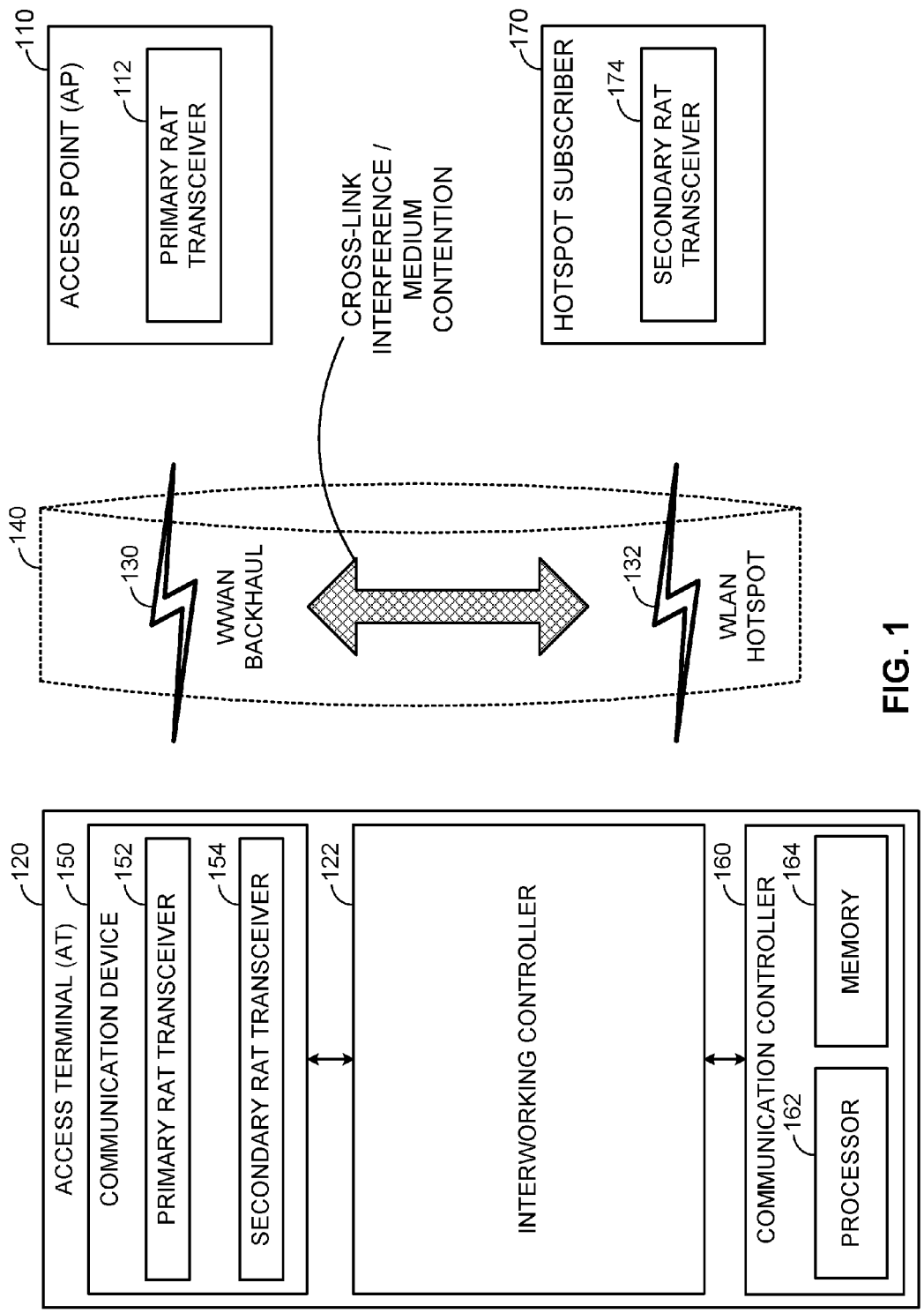
FIG. 1 is a system-level diagram illustrating an example wireless network environment.

FIG. 1 is a system-level diagram illustrating an example wireless network environment. As shown, the network may include several wireless nodes, including an access point 110, an access terminal 120, and a hotspot subscriber 170 (e.g., another access terminal). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wi-Fi access points (APs), other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access terminal 120 may generally include a wireless communication device 150 for communicating with other wireless nodes via at least one designated RAT. The communication device 150 may be variously configured for transmitting and encoding signals, and, conversely, for receiving and decoding signals in accordance with the designated RAT (e.g., messages, indications, information, pilots, and so on).

The communication device 150 may include, for example, one or more transceivers, with a primary RAT transceiver 152 and a co-located secondary RAT transceiver 154 being shown for illustration purposes. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access terminal 120 may also generally include a communication controller 160 for controlling operation of the communication device 150 (e.g., directing, modifying, enabling, disabling, etc.). The communication controller 160 may include a processor 162 and a memory 164 coupled to the processor 162. The memory 164 may be configured to store data, instructions, or a combination thereof, either as on-board cache memory, as separate components, a combination, etc. The processor 162 and the memory 164 may be standalone communication components or may be part of the respective host system functionality of the access terminal 120.

Turning to the illustrated communication in more detail, in this example the access terminal 120 may act as a "hotspot" for the hotspot subscriber 170 with the access point 110 providing a corresponding backhaul connection (e.g., to the Internet). The access terminal 120 and the access point 110 may communicate over a first wireless link 130 to provide a Wireless Wide Area Network (WWAN) backhaul connection. This communication may be performed via the primary RAT transceiver 152 at the access terminal 120 and a corresponding primary RAT transceiver 112 at the access point 110. As an example, the primary RAT transceiver 152 at the access terminal 120 and the primary RAT transceiver 112 at the access point 110 may utilize a Long Term Evolution (LTE) based RAT or the like. The access terminal 120 and the hotspot subscriber 170 may communicate over a second wireless link 132 to provide a Wireless Local Area Network (WLAN) hotspot connection. This communication may be performed via the secondary RAT transceiver 154 at the access terminal 120 and a corresponding secondary RAT transceiver 174 at the hotspot subscriber 170. As an example, the secondary RAT transceiver 154 at the access terminal 120 and the secondary RAT transceiver 174 at the hotspot subscriber 170 may utilize a Wi-Fi based RAT from the Institute of Electrical and Electronics Engineers (IEEE) 802.11 protocol family of standards or the like.

The wireless link 130 used for the WWAN backhaul connection and the wireless link 132 used for the WLAN hotspot connection may operate over the same, shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band over which the access point 110 provides one or more Secondary Cells (SCells), which may be used to supplement Primary Cell (PCell) operation on a different frequency band. Although various licensed frequency bands have been reserved for certain WWAN communications (e.g., by a government entity such as the Federal Communications Commission (FCC) in the United States), the access point 110 may extend its operation into unlicensed frequency bands such as the Industrial, Scientific, and Medical (ISM) and Unlicensed National Information Infrastructure (U-NII) bands used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access terminal 120 may be variously configured in accordance with the teachings herein to provide or otherwise support the inter-RAT coordination procedures discussed briefly above. For example, the access terminal 120 may include an interworking controller 122. The interworking controller 122 may be configured in different ways to manage the primary RAT transceiver 152 and the secondary RAT transceiver 154 to foster improved co-existence between the WWAN backhaul connection via the wireless link 130 and the WLAN hotspot connection via the wireless link 132.

Figure 2:
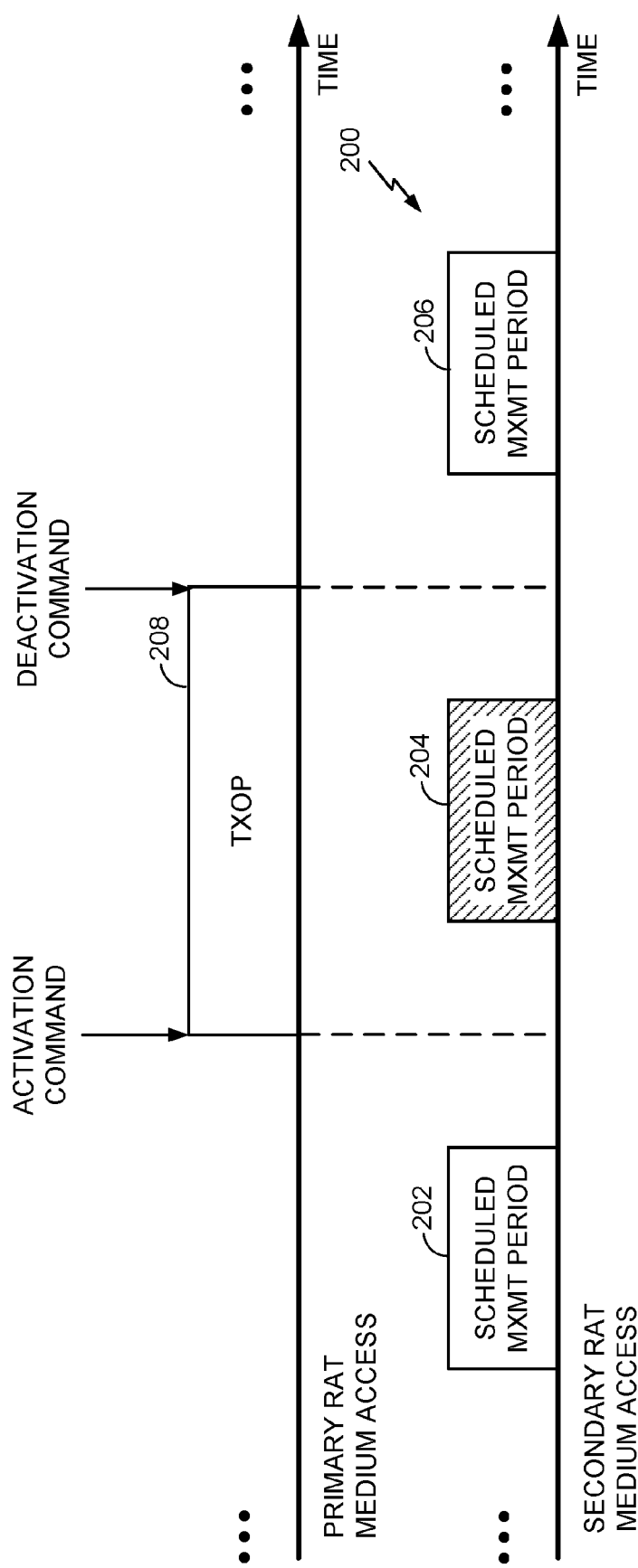
FIG. 2 is a timing diagram illustrating an example interaction between Radio Access Technology (RAT) operations.

FIG. 2 is a timing diagram illustrating an example interaction between primary and secondary RAT operation. In this example, the secondary RAT transceiver 154 is configured to wake up for medium sensing of the communication medium 140 as well as other functions in accordance with a corresponding wakeup schedule 200, shown by way of example as including three measurement (MXMT) periods 202, 204, and 206 (e.g., for CCA measurements or the like). Meanwhile, the primary RAT transceiver 152 is configured to occupy the communication medium 140 for a given transmission opportunity (TXOP) 208 in accordance with a series of activation and deactivation commands, such as Activation/Deactivation Medium Access Control (MAC) Control Elements (CEs), Radio Resource Control (RRC) Reconfiguration messages, and so on. Upon receipt of an activation command from the access point 110, the access terminal 120 enables operation of the primary RAT transceiver 152 on the communication medium 140. Upon receipt of a deactivation command from the access point 110, the access terminal 120 disables operation of the primary RAT transceiver 152 on the communication medium 140.

As shown, the first and third secondary RAT measurement periods 202 and 206 may occur outside of the primary RAT TXOP 208. The secondary RAT transceiver 154 may therefore perform medium sensing and seize the communication medium 140 without conflict from the primary RAT transceiver 152. The second secondary RAT measurement period 204, however, may occur during the primary RAT TXOP 208. In this instance, the secondary RAT transceiver 154 may determine that the communication medium 140 is occupied and return to a sleep state.

Rather than initiate the second secondary RAT measurement period 204, the interworking controller 122 may instead generate an activity indicator based on the activate operation of the primary RAT transceiver 152. Based on the activity indicator, the interworking controller 122 may disable operation of the secondary RAT transceiver 154 during the second secondary RAT measurement period 204. In this way, the interworking controller 122 may conserve power by skipping one or more measurements scheduled to be performed on the communication medium 140 during a known conflict in the wakeup schedule 200 with the primary RAT transceiver 152.

Figure 3:
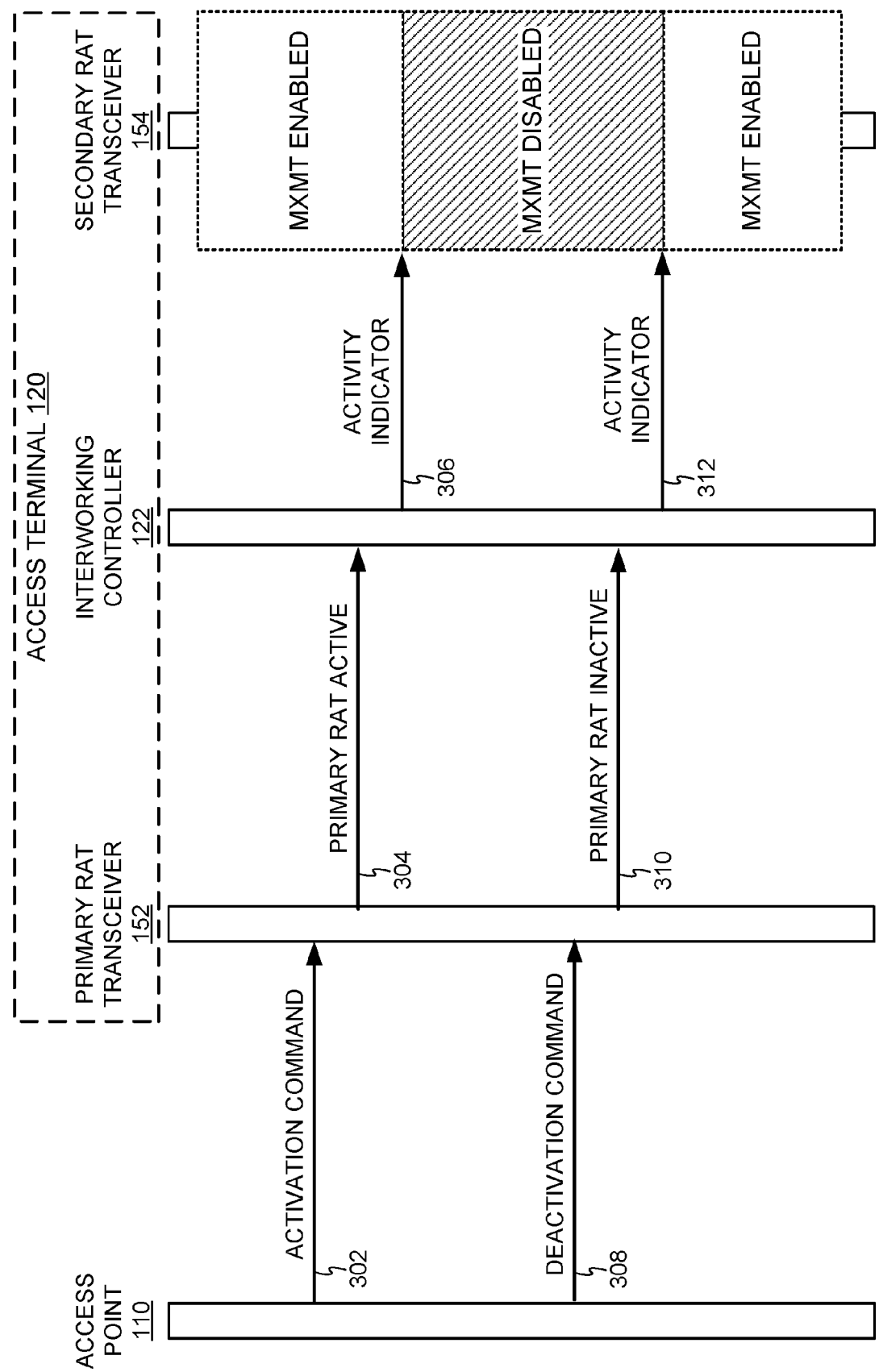
FIG. 3 is a flow diagram illustrating an example inter-RAT coordination scheme.

FIG. 3 is a flow diagram illustrating an example inter-RAT coordination scheme that may be implemented by the interworking controller 122. While the coordination is generally shown as being performed by the interworking controller 122, it will be appreciated that similar or equivalent functionality may be performed directly by the primary RAT transceiver 152 and secondary RAT transceiver 154, provided by other components such as the processor 162 and the memory 164 of the communication controller 160 or the like, and so on. It will also be appreciated that the disclosed techniques are not limited to access terminals per se, and may be in general performed by any wireless device that on the one hand receives information over a backhaul connection via one RAT, and on the other hand forwards such information over a hotspot connection via another RAT on the same communication medium.

As shown, the illustrated example begins with the primary RAT transceiver 152 being inactive and measurements at the secondary RAT transceiver 154 being enabled. In response to receipt of an activation command 302 from the access point 110, the primary RAT transceiver 152 may generate and send a primary RAT active notification 304 to the interworking controller 122. The primary RAT active notification 304 notifies the interworking controller 122 that primary RAT operation is now active on the communication medium 140.

Based on the toggling of the active/inactive status of the primary RAT transceiver 152, the interworking controller 122 may generate and send an activity indicator 306 to the secondary RAT transceiver 154. The activity indicator 306 may be implemented in different ways. For example, the activity indicator 306 may include a message with a payload that directly indicates an active (e.g., '1') or inactive (e.g., '0') status. As another example, the activity indicator 306 may include a constant or some other predefined value whose presence and timing are sufficient to indicate that the active/inactive status has changed from the previous state. In either case, the activity indicator 306 indicates to the secondary RAT transceiver 154 in one manner or another that primary RAT operation is now active on the communication medium 140. Based on this indication, one or more measurements otherwise scheduled to be performed by the secondary RAT transceiver 154 may be disabled to conserve power.

At some later point, the primary RAT transceiver 152 may receive a deactivation command 308 from the access point 110. In response, the primary RAT transceiver 152 may generate and send a primary RAT inactive notification 310 to the interworking controller 122. The primary RAT inactive notification 310 notifies the interworking controller 122 that primary RAT operation is now inactive on the communication medium 140.

Based again on the toggling of the status of the primary RAT transceiver 152, the interworking controller 122 may generate and send another activity indicator 312 to the secondary RAT transceiver 154. The activity indicator 312 may also be implemented in different ways, as discussed above. In the illustrated example, the activity indicator 312 indicates to the secondary RAT transceiver 154 in one manner or another that primary RAT operation is now inactive on the communication medium 140. Based on this indication, any measurements scheduled to be performed by the secondary RAT transceiver 154 may be re-enabled.

Figure 4:
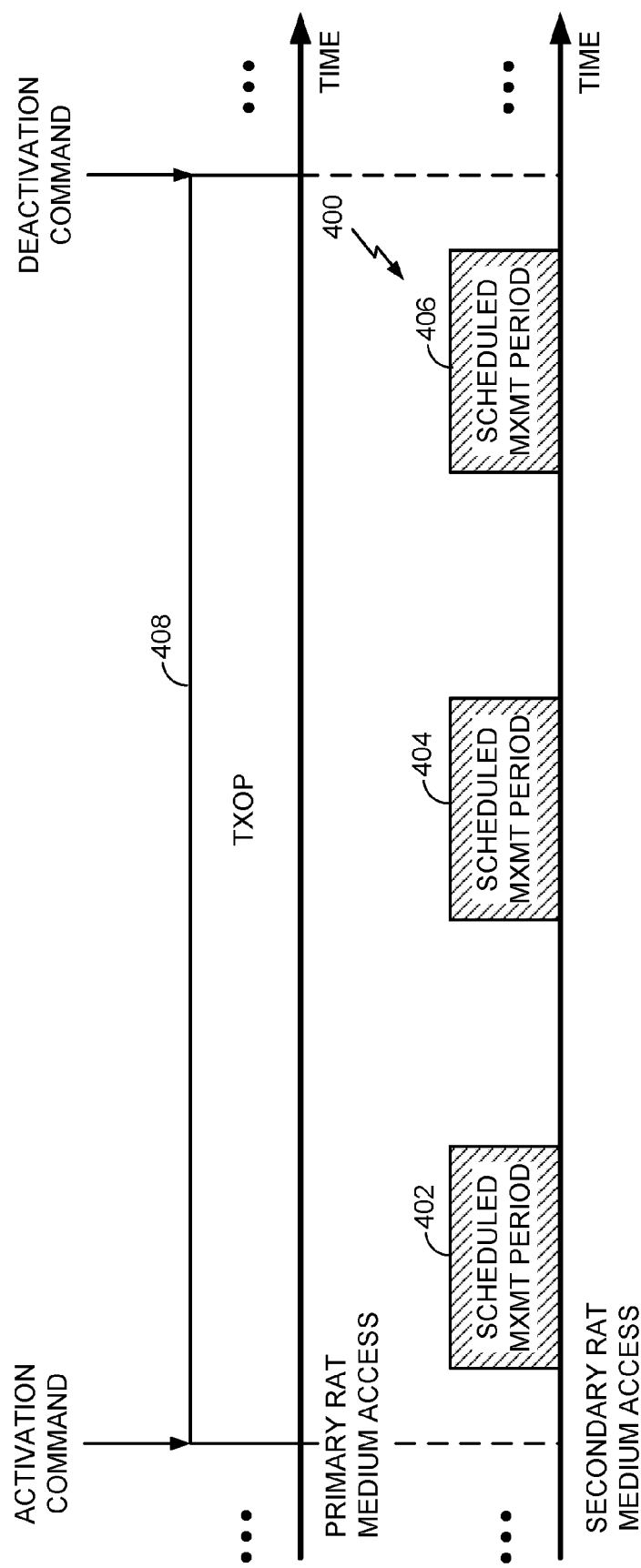
FIG. 4 is a timing diagram illustrating another example interaction between RAT operations.

FIG. 4 is a timing diagram illustrating another example interaction between primary and secondary RAT operation. In this example, the secondary RAT transceiver 154 is again configured to wake up for medium sensing of the communication medium 140 as well as other functions in accordance with a corresponding wakeup schedule 400, shown by way of example as including three measurement (MXMT) periods 402, 404, and 406. Meanwhile, the primary RAT transceiver 152 is configured to occupy the communication medium 140 for a given transmission opportunity (TXOP) 408 in accordance with a series of activation and deactivation commands, such as Activation/Deactivation MAC CEs, RRC Reconfiguration messages, and so on. Upon receipt of an activation command from the access point 110, the access terminal 120 again enables operation of the primary RAT transceiver 152 on the communication medium 140. Upon receipt of a deactivation command from the access point 110, the access terminal 120 again disables operation of the primary RAT transceiver 152 on the communication medium 140.

As shown, in this example each of the secondary RAT measurement periods 402, 404, and 406 may occur during the primary RAT TXOP 408. Thus, the secondary RAT transceiver 154 may determine that the communication medium 140 is occupied and return to a sleep state in several consecutive instances, which may significantly impact the latency of the WLAN hotspot connection via the wireless link 132.

To promote timely access to the communication medium 140 by the secondary RAT transceiver 154, the interworking controller 122 may monitor access of the secondary RAT transceiver 154 to the communication medium 140 and generate a priority indicator for the secondary RAT based thereon. For example, if the secondary RAT transceiver 154 is unsuccessful in securing access to the communication medium 140 after a substantial number of attempts or a substantial duration of time, the interworking controller 122 may prioritize secondary RAT communication over primary RAT communication. To this end, based on the priority indicator, the interworking controller 122 may coordinate the release of the WWAN backhaul connection via the wireless link 130.

Figure 5:
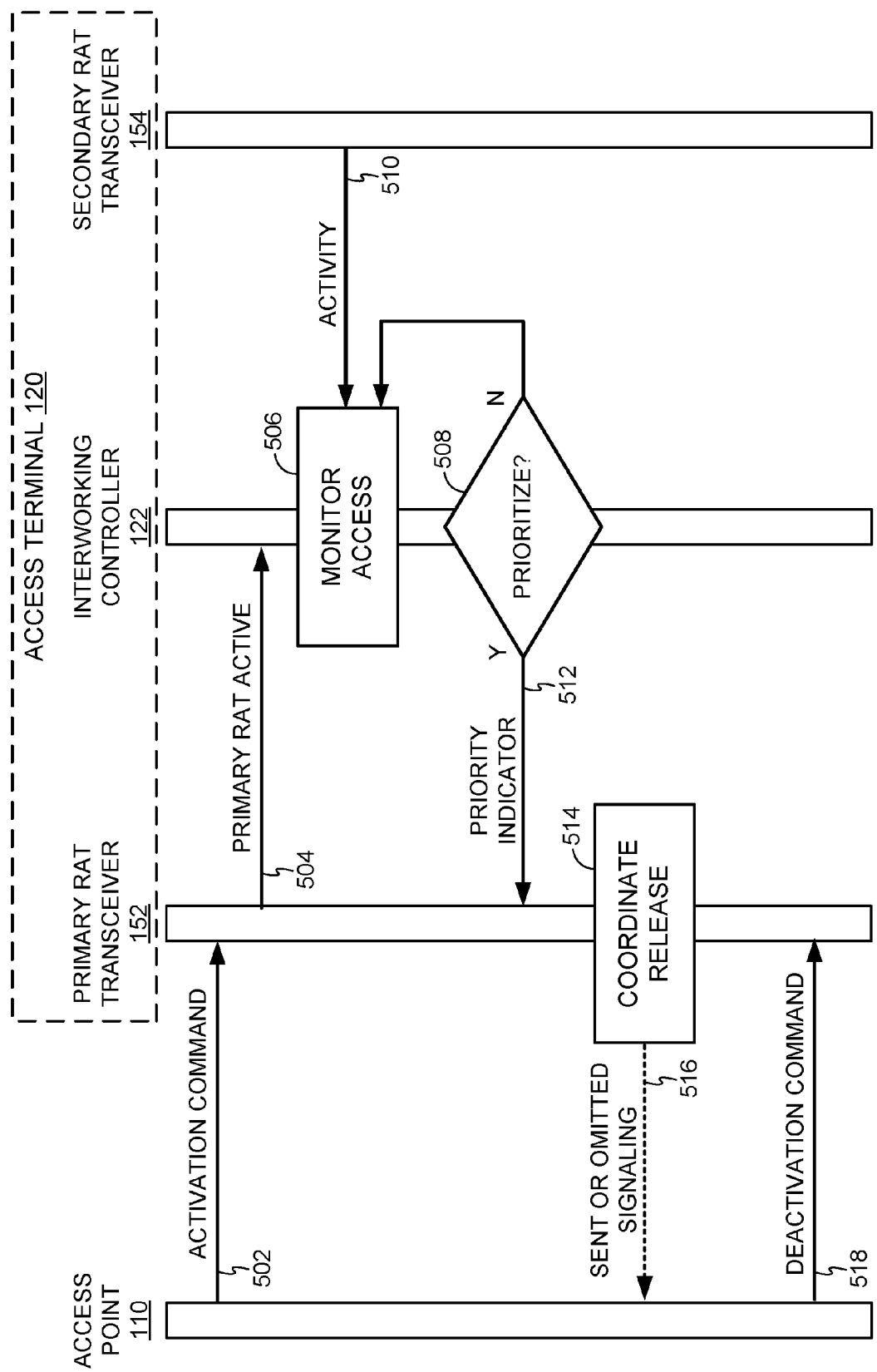
FIG. 5 is a flow diagram illustrating another example inter-RAT coordination scheme.

FIG. 5 is a flow diagram illustrating another example inter-RAT coordination scheme that may be implemented by the interworking controller 122. While the coordination is again generally shown as being performed by the interworking controller 122, it will be appreciated that similar or equivalent functionality may be performed directly by the primary RAT transceiver 152 and secondary RAT transceiver 154, provided by other components such as the processor 162 and the memory 164 of the communication controller 160 or the like, and so on. It will also be appreciated that the disclosed techniques are not limited to access terminals per se, and may be in general performed by any wireless device that on the one hand receives information over a backhaul connection via one RAT, and on the other hand forwards such information over a hotspot connection via another RAT on the same communication medium.

As shown, the illustrated example begins with the primary RAT transceiver 152 receiving an activation command 502 from the access point 110, then generating and sending a primary RAT active notification 504 to the interworking controller 122. The primary RAT active notification 504 notifies the interworking controller 122 that primary RAT operation is now active on the communication medium 140.

The interworking controller 122 may then monitor access of the secondary RAT transceiver 154 to the communication medium 140 (block 506) and determine whether to prioritize secondary RAT communication (decision 508). For example, the interworking controller 122 may receive activity notifications 510 from the secondary RAT transceiver 154, such as the number of consecutive, unsuccessful access attempts ($T_{attempts}$) and/or the duration of time over which access has been unsuccessful ($T_{duration}$). If neither metric exceeds a corresponding threshold ('no' at decision 508), the interworking controller 122 may continue to monitor access of the secondary RAT transceiver 154 to the communication medium 140 (return to block 506).

If, however, either metric meets or exceeds the corresponding threshold ('yes' at decision 508), the interworking controller 122 may generate a priority indicator 512. The priority indicator 512 notifies the primary RAT transceiver 152 that secondary RAT operation is now being prioritized. This prioritization may help to transmit any packets received over the WWAN backhaul connection via the wireless link 130 that are aging while awaiting transmission over the WLAN hotspot connection via the wireless link 132. In general, it may be desirable to prioritize such a transmission rather than further accumulating packets over the WWAN backhaul connection via the wireless link 130.

In some designs, each threshold may be adaptable based on network conditions or other factors. For example, each threshold may be set based, at least in part, on a Quality of Service (QoS) associated with the primary RAT transceiver 152, the secondary RAT transceiver 154, or both. When the QoS is high (e.g., real-time or near real-time), the number of attempts threshold and/or the duration threshold may be set to a relatively low value to meet the corresponding low latency requirements. Conversely, when the QoS is low (e.g., best effort), the number of attempts threshold and/or the duration threshold may be set to a relatively high value that allows for higher latency.

To effectuate the prioritization of secondary RAT operation, the primary RAT transceiver 152 may coordinate the release of the WWAN backhaul connection with the access point 110 via the wireless link 130 (block 514). The release may be coordinated in various ways, including indirectly using preexisting messaging, which may include sent or omitted signaling 516 to induce the release. For example, the primary RAT transceiver 152 may send to the access point 110 a channel quality report such as a Channel Quality Indication (CQI) indicating an artificially low quality for the WWAN backhaul connection via the wireless link 130—i.e., a value lower than the actual value to make the connection appear weak. A relatively low quality may induce the access point 110 to send a deactivation command 518 and thereby free the communication medium 140 for the secondary RAT transceiver 154. As another example, the primary RAT transceiver 152 may refrain from sending to the access point 110 one or more acknowledgement (ACK) messages for any downlink packets received over the WWAN backhaul connection via the wireless link 130. Absence of ACK messages may lead to a shrinking Transmission Control Protocol (TCP) window size and again induce the access point 110 to send the deactivation command 518, thereby freeing the communication medium 140 for the secondary RAT transceiver 154.

Figure 6:
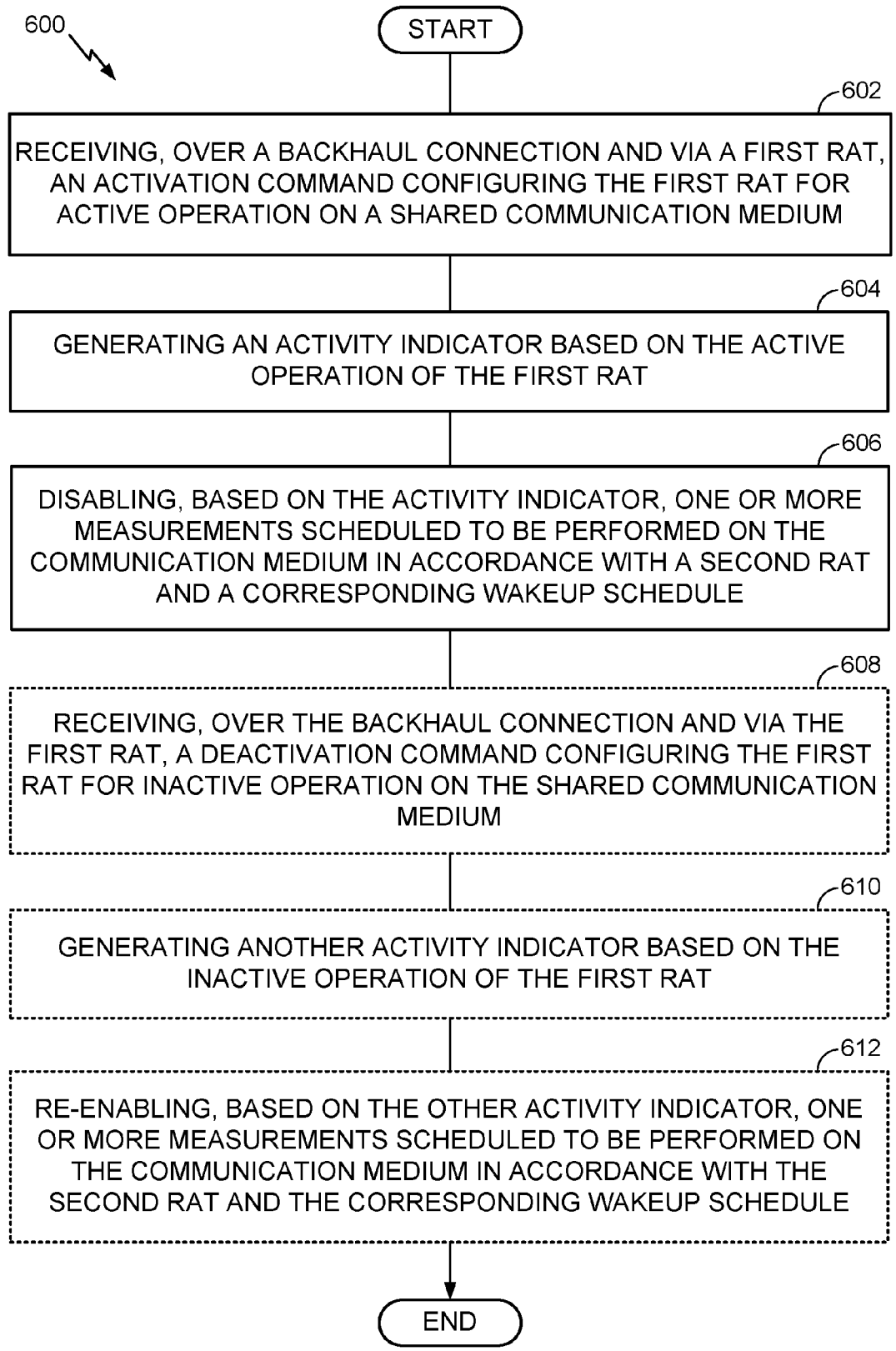
FIG. 6 is a flow diagram illustrating an example method of communication in accordance with the techniques described herein.

FIG. 6 is a flow diagram illustrating an example method of communication in accordance with the techniques described above. The method 600 may be performed, for example, by an access terminal (e.g., the access terminal 120 illustrated in FIG. 1) or in general any device operating on a shared communication medium. As an example, the communication medium may include one or more time, frequency, or space resources on an unlicensed radio frequency band shared between LTE technology and Wi-Fi technology devices.

As shown, the access terminal may receive, over a backhaul connection and via a first RAT, an activation command configuring the first RAT for active operation on a shared communication medium (block 602). The access terminal may generate an activity indicator based on the active operation of the first RAT (block 604). The access terminal may then disable, based on the activity indicator, one or more measurements scheduled to be performed on the communication medium in accordance with a second RAT and a corresponding wakeup schedule (block 606).

As discussed in more detail above, the access terminal may in general receive information over the backhaul connection via the first RAT and forward the information over a hotspot connection via the second RAT. As an example, the activation command or the deactivation command may include a MAC CE.

The generating (block 604) may include, for example, generating the activity indicator in response to operation of the first RAT toggling from inactive to active or from active to inactive. The activity indicator may include a direct indication of whether operation of the first RAT is active or inactive, or otherwise indicate that operation of the first RAT has changed.

The disabling (block 606) may include disabling the one or more measurements in response to the activity indicator indicating active operation of the first RAT and the wakeup schedule scheduling the one or more measurements during the active operation of the first RAT.

The access terminal may also receive, over the backhaul connection and via the first RAT, a deactivation command configuring the first RAT for inactive operation on the shared communication medium (optional block 608). The access terminal may then generate another activity indicator based on the inactive operation of the first RAT (optional block 610) and re-enable, based on the other activity indicator, one or more measurements scheduled to be performed on the communication medium in accordance with the second RAT and the corresponding wakeup schedule (optional block 612).

Figure 7:
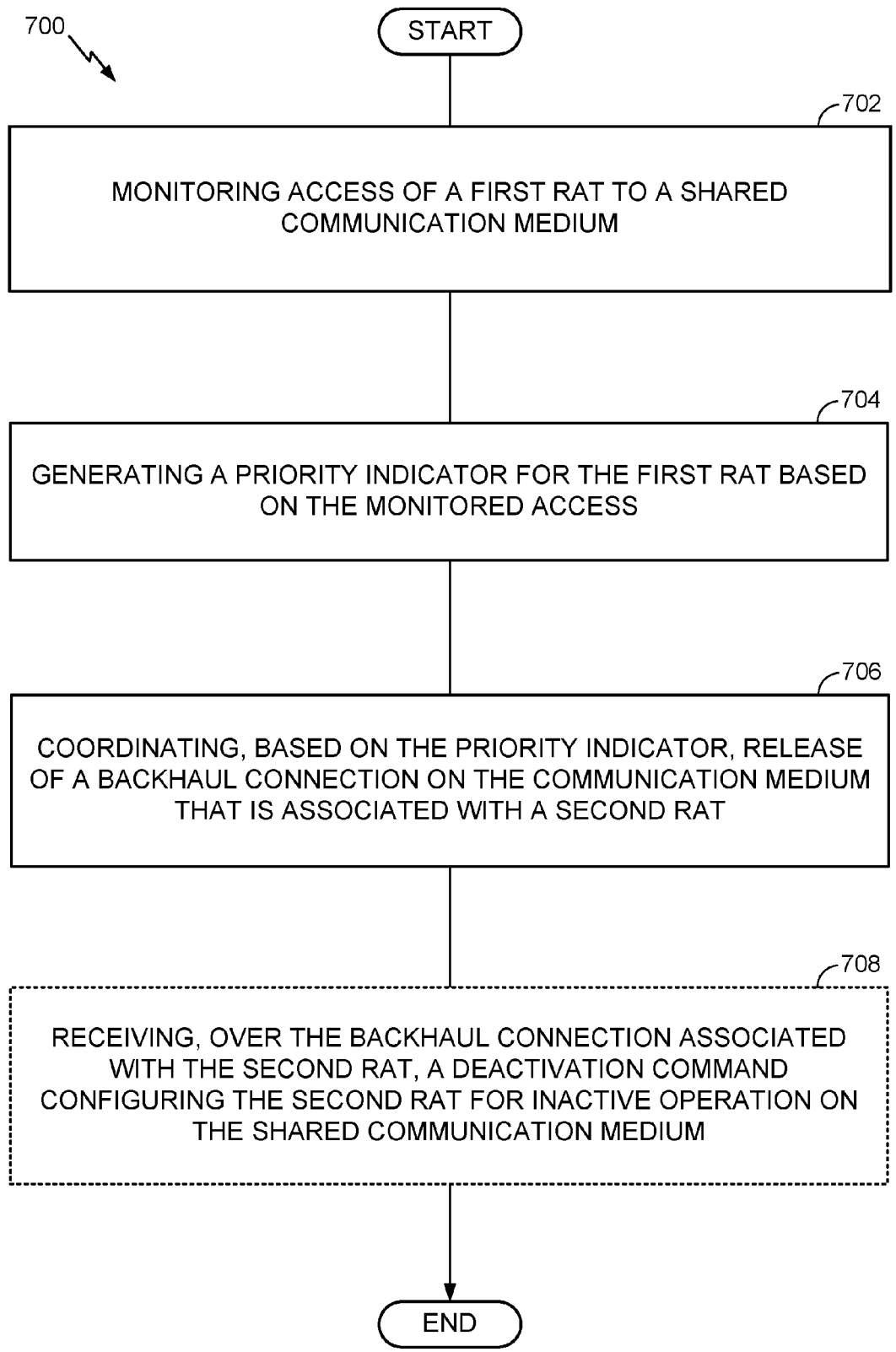
FIG. 7 is a flow diagram illustrating another example method of communication in accordance with the techniques described herein.

FIG. 7 is a flow diagram illustrating another example method of communication in accordance with the techniques described above. The method 700 may be performed, for example, by an access terminal (e.g., the access terminal 120 illustrated in FIG. 1) or in general any device operating on a shared communication medium. As an example, the communication medium may include one or more time, frequency, or space resources on an unlicensed radio frequency band shared between LTE technology and Wi-Fi technology devices.

As shown, the access terminal may monitor access of a first RAT to a shared communication medium (block 702). The access terminal may generate a priority indicator for the first RAT based on the monitored access (block 704). The access terminal may then coordinate, based on the priority indicator, release of a backhaul connection on the communication medium that is associated with a second RAT (block 706).

As discussed in more detail above, the monitoring (block 702) may include, for example, determining a number of consecutive, unsuccessful access attempts by the first RAT, and the generating (block 704) may include, for example, generating the priority indicator in response to the number of access attempts meeting or exceeding a threshold. The access terminal may set the threshold based on a QoS associated with the first RAT or the second RAT or other criteria.

The monitoring (block 702) may also include, as another example, determining a duration of time associated with unsuccessful access attempts by the first RAT, and the generating (block 704) may also include, as another example, generating the priority indicator in response to the duration meeting or exceeding a threshold. The access terminal may set the threshold based on a Quality of Service (QoS) associated with the first RAT or the second RAT or other criteria.

The coordinating (block 706) may include, for example, reporting an artificially low channel quality to an access point providing the backhaul connection associated with the second RAT.

The access terminal may also receive, over the backhaul connection associated with the second RAT, a deactivation command configuring the second RAT for inactive operation on the shared communication medium (optional block 708).

Figure 8:
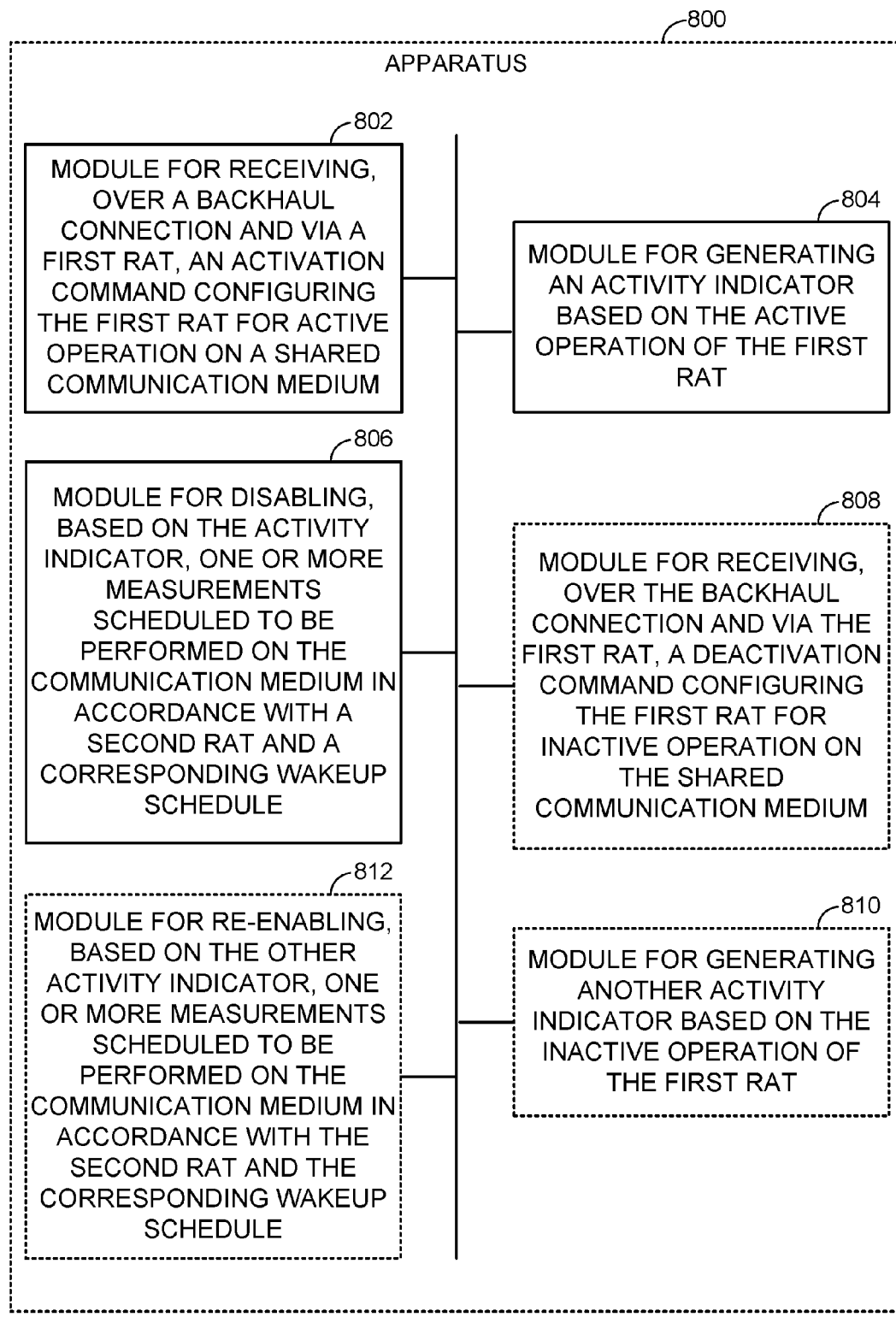
FIG. 8 illustrates an example apparatus represented as a series of interrelated functional modules.

FIG. 8 illustrates an example apparatus for implementing the interworking controller 122 represented as a series of interrelated functional modules. In the illustrated example, the apparatus 800 includes a module for receiving 802, a module for generating 804, a module for disabling 806, an (optional) module for receiving 808, an (optional) module for generating 810, and an (optional) module for re-enabling 812.

The module for receiving 802 may be configured to receive, over a backhaul connection and via a first RAT, an activation command configuring the first RAT for active operation on a shared communication medium. The module for generating 804 may be configured to generate an activity indicator based on the active operation of the first RAT. The module for disabling 806 may be configured to disable, based on the activity indicator, one or more measurements scheduled to be performed on the communication medium in accordance with a second RAT and a corresponding wakeup schedule.

The (optional) module for receiving 808 may be configured to receive, over the backhaul connection and via the first RAT, a deactivation command configuring the first RAT for inactive operation on the shared communication medium. The (optional) module for generating 810 may be configured to generate another activity indicator based on the inactive operation of the first RAT. The (optional) module for re-enabling 812 may be configured to re-enable, based on the other activity indicator, one or more measurements scheduled to be performed on the communication medium in accordance with the second RAT and the corresponding wakeup schedule.

Figure 9:
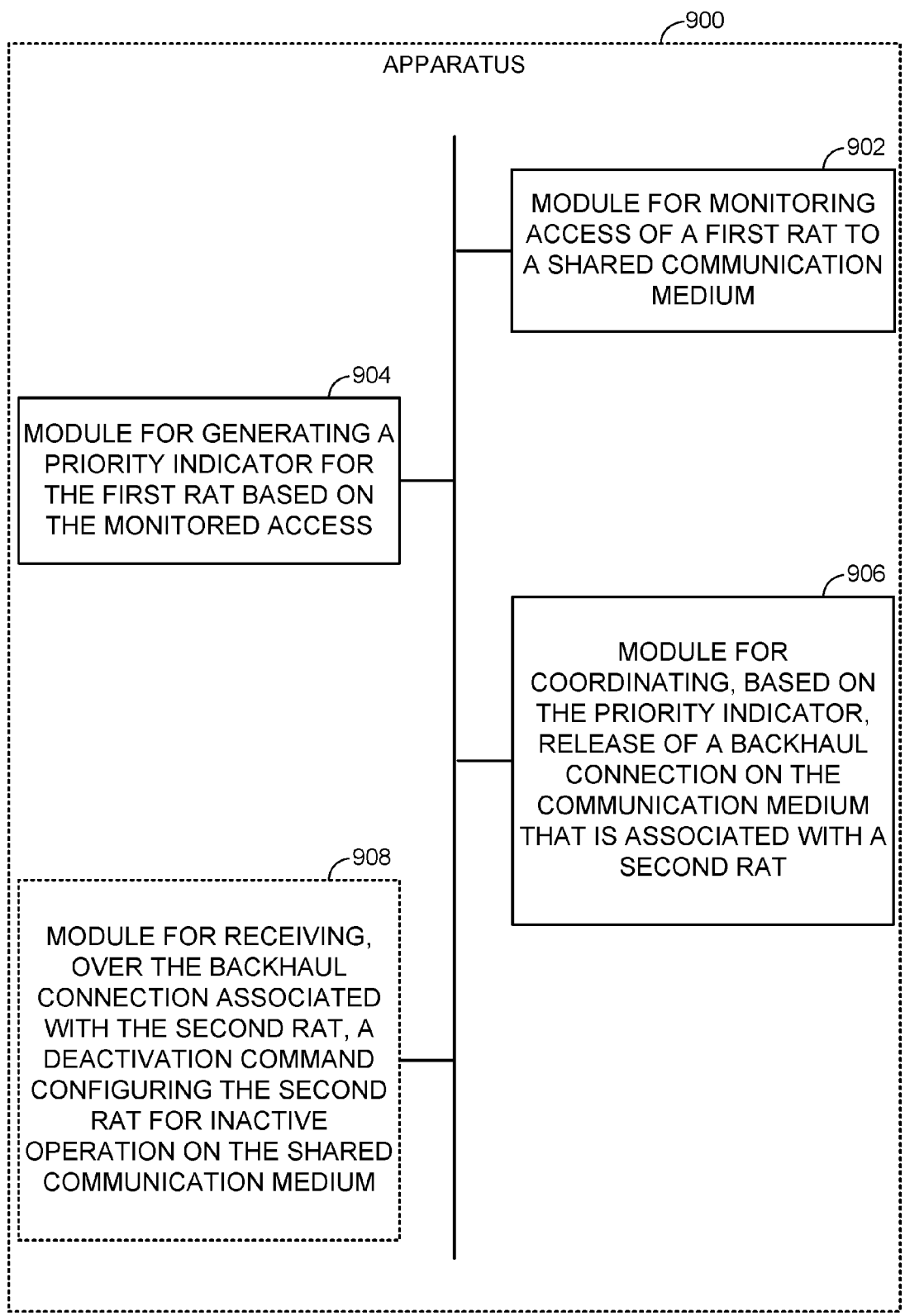
FIG. 9 illustrates another example apparatus represented as a series of interrelated functional modules.

FIG. 9 illustrates another example apparatus for implementing the interworking controller 122 represented as a series of interrelated functional modules. In the illustrated example, the apparatus 900 includes a module for monitoring 902, a module for generating 904, a module for coordinating 906, and an (optional) module for receiving 908.

The module for monitoring 902 may be configured to monitor access of a first RAT to a shared communication medium. The module for generating 904 may be configured to generate a priority indicator for the first RAT based on the monitored access. The module for coordinating 906 may be configured to coordinate, based on the priority indicator, release of a backhaul connection on the communication medium that is associated with a second RAT. The (optional) module for receiving 908 may be configured to receive, over the backhaul connection associated with the second RAT, a deactivation command configuring the second RAT for inactive operation on the shared communication medium.

The functionality of the modules of FIGS. 8-9 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 8-9, as well as other components and functions described herein, may be implemented using any suitable means. Such means also may be implemented, at least in part, using corresponding structure as taught herein. For example, the components described above in conjunction with the "module for" components of FIGS. 8-9 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well as in sequences of actions that may be represented by pseudocode. For example, the components and functions represented by FIGS. 8-9 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of communication, comprising:
   receiving, over a backhaul connection and via a first Radio Access Technology (RAT), an activation command configuring the first RAT for active operation on a shared communication medium;
   generating an activity indicator based on the active operation of the first RAT; and
   disabling, based on the activity indicator, one or more measurements scheduled to be performed on the shared communication medium in accordance with a second RAT and a corresponding wakeup schedule.

2. The method of claim 1, further comprising:
   receiving information over the backhaul connection via the first RAT; and
   forwarding the information over a hotspot connection via the second RAT.

3. The method of claim 1, wherein the generating comprises generating the activity indicator in response to operation of the first RAT toggling from inactive to active or from active to inactive.

4. The method of claim 3, wherein the activity indicator comprises a direct indication of whether operation of the first RAT is active or inactive.

5. The method of claim 3, wherein the activity indicator indicates that operation of the first RAT has changed.

6. The method of claim 1, wherein the disabling comprises disabling the one or more measurements in response to the activity indicator indicating active operation of the first RAT and the wakeup schedule scheduling the one or more measurements during the active operation of the first RAT.

7. The method of claim 1, further comprising:
   receiving, over the backhaul connection and via the first RAT, a deactivation command configuring the first RAT for inactive operation on the shared communication medium;
   generating another activity indicator based on the inactive operation of the first RAT; and
   re-enabling, based on the other activity indicator, one or more measurements scheduled to be performed on the shared communication medium in accordance with the second RAT and the corresponding wakeup schedule.

8. The method of claim 7, wherein at least one of the activation command or the deactivation command comprises a Medium Access Control (MAC) Control Element (CE).

9. The method of claim 1, wherein the shared communication medium comprises one or more time, frequency, or space resources on an unlicensed radio frequency band.

10. The method of claim 1, wherein:
    the first RAT comprises Long Term Evolution (LTE) technology; and
    the second RAT comprises Wi-Fi technology.

11. A communication apparatus, comprising:
    at least one transceiver configured to receive, over a backhaul connection and via a first Radio Access Technology (RAT), an activation command configuring the first RAT for active operation on a shared communication medium;
    at least one processor; and
    at least one memory, the at least one processor and the at least one memory being configured to generate an activity indicator based on the active operation of the first RAT, and to disable, based on the activity indicator, one or more measurements scheduled to be performed on the shared communication medium in accordance with a second RAT and a corresponding wakeup schedule.

12. The communication apparatus of claim 11, wherein the at least one transceiver is further configured to:
   receive information over the backhaul connection via the first RAT; and
   forward the information over a hotspot connection via the second RAT.

13. The communication apparatus of claim 11, wherein the at least one processor and the at least one memory are configured to generate the activity indicator in response to operation of the first RAT toggling from inactive to active or from active to inactive.

14. The communication apparatus of claim 13, wherein the activity indicator comprises a direct indication of whether operation of the first RAT is active or inactive.

15. The communication apparatus of claim 13, wherein the activity indicator indicates that operation of the first RAT has changed.

16. The communication apparatus of claim 11, wherein the at least one processor and the at least one memory are configured to disable the one or more measurements in response to the activity indicator indicating active operation of the first RAT and the wakeup schedule scheduling the one or more measurements during the active operation of the first RAT.

17. The communication apparatus of claim 11, wherein:
   the at least one transceiver is further configured to receive, over the backhaul connection and via the first RAT, a deactivation command configuring the first RAT for inactive operation on the shared communication medium; and
   the at least one processor and the at least one memory are further configured to generate another activity indicator based on the inactive operation of the first RAT, and to re-enable, based on the other activity indicator, one or more measurements scheduled to be performed on the shared communication medium in accordance with the second RAT and the corresponding wakeup schedule.

18. The communication apparatus of claim 17, wherein at least one of the activation command or the deactivation command comprises a Medium Access Control (MAC) Control Element (CE).

19. The communication apparatus of claim 11, wherein the shared communication medium comprises one or more time, frequency, or space resources on an unlicensed radio frequency band.

20. The communication apparatus of claim 11, wherein:
   the first RAT comprises Long Term Evolution (LTE) technology; and
   the second RAT comprises Wi-Fi technology.

21. A communication apparatus, comprising:
   means for receiving, over a backhaul connection and via a first Radio Access Technology (RAT), an activation command configuring the first RAT for active operation on a shared communication medium;
   means for generating an activity indicator based on the active operation of the first RAT; and
   means for disabling, based on the activity indicator, one or more measurements scheduled to be performed on the shared communication medium in accordance with a second RAT and a corresponding wakeup schedule.

22. The communication apparatus of claim 21, further comprising:
   means for receiving information over the backhaul connection via the first RAT; and
   means for forwarding the information over a hotspot connection via the second RAT.

23. The communication apparatus of claim 21, wherein the means for generating comprises means for generating the activity indicator in response to operation of the first RAT toggling from inactive to active or from active to inactive.

24. The communication apparatus of claim 23, wherein the activity indicator comprises a direct indication of whether operation of the first RAT is active or inactive.

25. The communication apparatus of claim 23, wherein the activity indicator indicates that operation of the first RAT has changed.

26. The communication apparatus of claim 21, wherein the means for disabling comprises means for disabling the one or more measurements in response to the activity indicator indicating active operation of the first RAT and the wakeup schedule scheduling the one or more measurements during the active operation of the first RAT.

27. The communication apparatus of claim 21, further comprising:
   means for receiving, over the backhaul connection and via the first RAT, a deactivation command configuring the first RAT for inactive operation on the shared communication medium;
   means for generating another activity indicator based on the inactive operation of the first RAT; and
   means for re-enabling, based on the other activity indicator, one or more measurements scheduled to be performed on the shared communication medium in accordance with the second RAT and the corresponding wakeup schedule.

28. The communication apparatus of claim 27, wherein at least one of the activation command or the deactivation command comprises a Medium Access Control (MAC) Control Element (CE).

29. The communication apparatus of claim 21, wherein the shared communication medium comprises one or more time, frequency, or space resources on an unlicensed radio frequency band.

30. The communication apparatus of claim 21, wherein:
   the first RAT comprises Long Term Evolution (LTE) technology; and
   the second RAT comprises Wi-Fi technology.

31. A non-transitory computer-readable medium comprising code, which, when executed by a processor, causes the processor to perform operations for communication, the non-transitory computer-readable medium comprising:
   code for receiving, over a backhaul connection and via a first Radio Access Technology (RAT), an activation command configuring the first RAT for active operation on a shared communication medium;
   code for generating an activity indicator based on the active operation of the first RAT; and
   code for disabling, based on the activity indicator, one or more measurements scheduled to be performed on the shared communication medium in accordance with a second RAT and a corresponding wakeup schedule.

32. The non-transitory computer-readable medium of claim 31, further comprising:
   code for receiving information over the backhaul connection via the first RAT; and
   code for forwarding the information over a hotspot connection via the second RAT.

33. The non-transitory computer-readable medium of claim 31, wherein the code for generating comprises code for generating the activity indicator in response to operation of the first RAT toggling from inactive to active or from active to inactive.

34. The non-transitory computer-readable medium of claim 33, wherein the activity indicator comprises a direct indication of whether operation of the first RAT is active or inactive.

35. The non-transitory computer-readable medium of claim 33, wherein the activity indicator indicates that operation of the first RAT has changed.

36. The non-transitory computer-readable medium of claim 31, wherein the code for disabling comprises code for disabling the one or more measurements in response to the activity indicator indicating active operation of the first RAT and the wakeup schedule scheduling the one or more measurements during the active operation of the first RAT.

37. The non-transitory computer-readable medium of claim 31, further comprising:
   code for receiving, over the backhaul connection and via the first RAT, a deactivation command configuring the first RAT for inactive operation on the shared communication medium;
   code for generating another activity indicator based on the inactive operation of the first RAT; and
   code for re-enabling, based on the other activity indicator, one or more measurements scheduled to be performed on the shared communication medium in accordance with the second RAT and the corresponding wakeup schedule.

38. The non-transitory computer-readable medium of claim 37, wherein at least one of the activation command or the deactivation command comprises a Medium Access Control (MAC) Control Element (CE).

39. The non-transitory computer-readable medium of claim 31, wherein the shared communication medium comprises one or more time, frequency, or space resources on an unlicensed radio frequency band.

40. The non-transitory computer-readable medium of claim 31, wherein:
   the first RAT comprises Long Term Evolution (LTE) technology; and
   the second RAT comprises Wi-Fi technology.

* * * * *